UNITED STATES PATENT OFFICE.

FRANCIS DAVID MULLIGAN, OF BELFAST, IRELAND.

NON-POROUS CEMENT.

1,338,033.      Specification of Letters Patent.      Patented Apr. 27, 1920.

No Drawing.      Application filed June 2, 1919. Serial No. 301,284.

*To all whom it may concern:*

Be it known that I, FRANCIS DAVID MULLIGAN, a subject of the King of Great Britain and Ireland, residing at Belfast, Ireland, have invented a certain new and useful Non-Porous Cement, of which the following is a specification.

This invention relates to the manufacture of non-porous cement by the use of a novel compound, which, when added to ordinary cement, will strengthen it and render it waterproof.

The compound is made by mixing thoroughly slaked lime with raw linseed, or equivalent, oil of the class known as drying oils, and in suitable proportions, such, for example, as 3 ozs., by weight, of oil to 20 ozs. of lime.

The compound or mixture is added to ordinary cement and sand, after the cement and sand have been mixed with water in the usual way, and in the proportion of, say, half an ounce of the compound to one pound of sand and ordinary cement.

The proportion of sand added to the ordinary cement is governed by the use to which the cement is to be put.

The cement, when tested in water, does not increase in bulk or weight, as usual, but tends to throw off the water.

Suitable coloring matter may be added to the cement if desired.

The ingredients in the proportions specified, may be mixed with water to make a wet form of the cement or they may be dried and made into a powder.

The compound can be made up wet or it may be dried and made into a dry powder. The compound, mixed with cement, can be used for all general purposes in which cement is used. It will also set in water.

The addition of the compound to ordinary cement renders it waterproof and also adds considerably to its strength.

Having now fully described my invention what I claim and desire to secure by Letters Patent is:—

1. In a cement, a compound for waterproofing and strengthening same, comprising a mixture of slaked lime and raw linseed oil in the proportion of 20 ozs., by weight, of lime to 3 ozs., by weight, of oil which mixture is added to the cement.

2. A cementitious compound consisting of a mixture of cement and sand to which is added a mixture of slaked lime and raw linseed oil in the proportion of 20 ozs., by weight, of lime, to 3 ozs., by weight, of oil.

3. In a cement, a compound for waterproofing and strengthening same, comprising a mixture of slaked lime and raw linseed oil in the proportion of 20 ozs., by weight, of lime to 3 ozs., by weight, of oil which mixture is added to the cement in the proportion of ½ oz. thereof of 1 lb. of cement and 1 lb. of sand.

4. A cementitious compound consisting of a mixture of cement and sand in the proportion of 1 lb. cement to 1 lb. of sand to which is added ½ oz., by weight, of a mixture of slaked lime and raw linseed oil in the proportion of 20 ozs., by weight, of lime, to 3 ozs., by weight, of oil.

In testimony whereof I affix my signature in presence of two witnesses.

FRANCIS DAVID MULLIGAN.

Witnesses:
   SAMUEL YOUNG,
   ANDREW HAMILTON.